(12) United States Patent
Hauge et al.

(10) Patent No.: US 7,670,583 B2
(45) Date of Patent: Mar. 2, 2010

(54) MULTI-STEP PURIFICATION OF SINGLE-WALL CARBON NANOTUBES

(75) Inventors: Robert H. Hauge, Houston, TX (US);
Ya-Qiong Xu, Houston, TX (US);
Haiqing Peng, Houston, TX (US);
Richard E. Smalley, Houston, TX (US);
Irene Morin Marek, legal representative, Houston, TX (US)

(73) Assignee: William Marsh Rice University, Houston, TX (US)

( * ) Notice: Subject to any disclaimer, the term of this patent is extended or adjusted under 35 U.S.C. 154(b) by 734 days.

(21) Appl. No.: 11/291,638

(22) Filed: Nov. 30, 2005

(65) Prior Publication Data

US 2010/0008843 A1    Jan. 14, 2010

Related U.S. Application Data

(60) Provisional application No. 60/632,113, filed on Dec. 1, 2004.

(51) Int. Cl.
*C01B 31/02* (2006.01)
*D01F 9/12* (2006.01)
*D01C 5/00* (2006.01)

(52) U.S. Cl. .............. 423/461; 423/447.1; 423/447.3; 977/845

(58) Field of Classification Search ... 423/447.1–447.8, 423/461; 977/845
See application file for complete search history.

(56) References Cited

U.S. PATENT DOCUMENTS

2002/0046872 A1* 4/2002 Smalley et al. .......... 174/137 A

2002/0159944 A1* 10/2002 Smalley et al. ........... 423/447.6

OTHER PUBLICATIONS

Strong, et al., Purification process for single-wall carbon nanotubes, Carbon 2003; 41: 1477-1488.*
Opalovsky, et al., DTA Study of Reactions of Non-metal Fluorides with Inorganic Compounds, J Thermal Analsysis 1979; 15: 67-77.*
Iijima, "Helical microtubules of graphitic carbon", 354 Nature (1991), pp. 56-58.
Iijima et al., "Single-shell carbon nanotubes of 1-nm diameter" 363 Nature (1993), pp. 603-660.
Baughman et al., "Carbon Nanotubes—the Route Toward Applications", 297 Science (2002), pp. 787-792.
Bronikowski et al.,"Gas-phase production of carbon single-walled nanotubes from carbon monoxide . . . " 19 J. Vac. Sci. Technol. (2001), pp. 1800-1805.
Nikolaev et al., "Gas-pase catalytic growth of siingle-walled carbon nanotubes from carbon monoxide", 313 Chem. Phys. Lett. (1999), pp. 91-97.

(Continued)

*Primary Examiner*—Stanley S. Silverman
*Assistant Examiner*—Daniel C. McCracken
(74) *Attorney, Agent, or Firm*—Winstead PC (57) ABSTRACT

The present invention relates to processes for the purification of single-wall carbon nanotubes (SWNTs). Known methods of single-wall carbon nanotube production result in a single-wall carbon nanotube product that contains single-wall carbon nanotubes in addition to impurities including residual metal catalyst particles and amounts of small amorphous carbon sheets that surround the catalyst particles and appear on the side of the single-wall carbon nanotubes. The present purification processes remove the extraneous carbon as well as metal-containing residual catalyst particles.

26 Claims, 9 Drawing Sheets

Scheme 1

OTHER PUBLICATIONS

Thess et al., "Crystalline Ropes of Metallic Carbon Nanotubes" 273 Science (1996), pp. 483-487.

Yumura et al., "A Study on the Purification Mehtods of carbon nanotubes and STM Imaging . . ." 349 Mater. Res. Soc. Symp. Proc. Novel Forms of Carbon II (1994) p. 231-5.

Dillon et al., "A Simple and Complete Purification of Single-walled Carbon Nanotube Materials", 16 Adv. Mater. (1999), pp. 1354-1358.

Bandow et al., "Purification and magnetic properties of carbon nanotubes", 67 Appl. Phys. A (1999), pp. 23-27.

Rinzler et al., "Large-scale purification of single-wall carbon nanotubes: process, product and characterization", 67 Appl. Phys. A (1998), pp. 29-37.

Dujardin et al., "Purification of Single-Shell Nanotubes", 10 Adv. Mater. (1998), pp. 611-613.

Hiura et al., "Opening and Purification of carbon nanotubes in High Yields", 7(3) Adv. Mater. (1995), pp. 275-276.

Chiang et al., "Purification and Characterization of Single-Wall Carbon Nanotubes", 105 J. Phys. Chem. B (2001), pp. 1157-1161.

Chiang et al., "Purification and Characterization of Single-Wall Carbon Nanotubes . . . ", 105 J. Phys. Chem. B (2001), pp. 8297-8301.

Banerjee et al., "Rational Sidewall Functionalization and Purification of Single-Walled carbon nanotubes . . . ", 106 J. Phys. Chem. B (2002), pp. 12144-12151.

Borowiak-Palen et al., "Reduced diameter distribution of single-wall carbon nanotubes by selective oxidation", 363 J. Chem. Phys. Lett. (2002), pp. 567-572.

Farkas et al., "Length sorting cut single wall carbon nanotubes . . . " 363 Chem. Phys. Lett. (2002), pp. 111-116.

Georgakilas et al., "Purification of HiPCO Carbon Nanotubes via Organic Functionalization", 124 J. Am. Chem. Soc. (2002), pp. 14318-14319.

Harutyunyan et al., "Purification of Single-Wall Carbon Nanotubes by Selective Microwave Heating of Catalyst Particles", 106 J. Phys. Chem. B (2002), pp. 8671-8675.

Hou et al., "Purification of single-walled carbon nanotubes synthesized by the hydrogen arc-discharge method", 16 J. Mater. Res. (2001), pp. 2526-2529.

Hu et al., "Nitric Acid Purification of Single-Walled Carbon Nanotubes", 107 J. Phys. Chem. B (2003) pp. 13838-13842.

Moon et al., "High Yield Purification Process of Singlewalled Carbon Nanotubes", 105 J. Phys. Chem. B (2001), pp. 5677-5681.

Niyogi et al., "Chromatographic Purification of Soluble Single-Walled Carbon Nanotubes (s-SWNT's)", 123 J. Am. Chem. Soc. (2001), pp. 733-734.

Sen et al., "Controlled Purification of Single-Walled Carbon Nanotube Films by Use of Selective Oxidation and Near-IR Spectroscopy", 15 Chem. Mater. (2003), pp. 4273-4279.

Smith et al., "Selective oxidation of single-walled carbon nanotubes using carbon dioxide", 41 Carbon (2003), pp. 1221-1230.

Thien-Nga et al., "Mechanical Purification of Single-Walled Carbon Nanotube Bundles from Catalytic Particles", 2 Nano Lett. (2002), pp. 1349-1352.

Zhao et al., "Chromatographic Purification and Properties of Soluble Single-Walled Carbon Nanotubes", 123 J. Am. Chem. Soc. (2001), pp. 11673-11677.

Zimmerman et al., "Gas-Phase Purification of Single-Wall Carbon Nanotubes", 12 Chem. Mater. (2000), pp. 1361-1366.

Xu et al., "Controlled Multistep Purification of Single-Walled Carbon Nanotubes", 5 Nano Lett. (2005), pp. 163-168.

O'Connell et al., "Band Gap Fluorescence from Individual Single-Walled Carbon Nanotubes", 297 Science (2002), pp. 593-596.

Bachilo et al., "Structure-Assigned Optical Spectra of Single-Walled Carbon Nanotubes" 298 Science (2002), pp. 2361-2366.

Nakayama et al, "Strained Lattice Organic Thin Film Growth by Molecular Beam Epitaxy", Mol. Cryst. Liq. Cryst., vol. 276, pp. 267-271, 1996.

Bethune et al, "Cobalt-catalysed growth of carbon nanotubes with single-atomic-layer walls", Nature, vol. 363, pp. 605-607, Jun. 17, 1993.

* cited by examiner

Scheme 1

Fig. 8

MULTI-STEP PURIFICATION OF SINGLE-WALL CARBON NANOTUBES

CROSS-REFERENCE TO RELATED APPLICATIONS

This Application for Patent claims priority to U.S. Provisional Patent Application Ser. No. 60/632,113, filed Dec. 1, 2004.

FEDERALLY-SPONSORED RESEARCH

This invention was made, in part, with support from the Air Force Office of Scientific Research, Grant No. F33615-01-D-5802.

FIELD OF THE INVENTION

This invention relates generally to carbon nanotubes, and specifically to methods of purifying such materials.

BACKGROUND

Carbon nanotubes (CNTs), comprising multiple concentric shells and termed multi-wall carbon nanotubes (MWNTs), were discovered by Iijima in 1991 [Iijima, *Nature* 1991, 354, 56-58]. Subsequent to this discovery, single-wall carbon nanotubes (SWNTs), comprising single graphene sheets rolled up on themselves to form cylindrical tubes with nanoscale diameters, were synthesized in an arc-discharge process using carbon electrodes doped with transition metals [Iijima et al., *Nature* 1993, 363, 603-605; and Bethune et al., *Nature* 1993, 363, 605-607]. These carbon nanotubes (especially SWNTs) possess unique mechanical, electrical, thermal and optical properties, and such properties make them attractive for a wide variety of applications. See Baughman et al., *Science,* 2002, 297, 787-792.

In recent years, SWNTs have been intensively studied because of their many potential applications. A high-pressure CO (HiPco) process, where $Fe(CO)_5$ is used as catalyst, is one of the most productive methods for SWNT production [Bronikowski et al., *J. Vac. Sci. Technol.* 2001, 19, 1800; Nikolaev et al., *Chem. Phys. Lett.* 1999, 313, 91; Thess et al., *Science* 1996, 273, 187-191]. However, the iron and non-nanotube carbon impurities present in the as-produced material need to be removed without damaging the SWNTs. To remove catalyst (such as iron, cobalt, and/or nickel) and obtain high-purity SWNTs, many purification methods have been reported previously. See, e.g., Hidefumi, *Mol. Cryst. Liq. Cryst. Sci. Technol., Sect. A* 1995, 276, 267; Yumura et al., *Mater. Res. Soc. Symp. Proc. Novel Forms of Carbon II* 1994, 349, 231; Dillon et al., *Adv. Mater.* 1999, 16, 1354; Bandow et al., *Appl. Phys. A* 1999, 67; Rinzler et al., *Appl. Phys. A* 1998, 67, 29-37; Dujardin et al., *Adv. Mater.* 1998, 10, 611; Hiura et al., *Adv. Mater.* 1995, 7, 275; Chiang et al., *J. Phys. Chem. B* 2001, 105, 1157-1161; Chiang et al., *J. Phys. Chem. B* 2001, 105, 8297-8301; Banerjee et al., *J. Phys. Chem. B* 2002, 106, 12144-12151; Borowiak-Palen et al., *J. Chem. Phys. Lett.* 2002, 363, 567; Farkas et al., *Chem. Phys. Lett.* 2002, 363, 111; Georgakilas et al., *J. Am. Chem. Soc.* 2002, 124, 14318-14319; Harutyunyan et al., *J. Phys. Chem. B* 2002, 106, 8671-8675; Hou et al., *J. Mater. Res.* 2001, 16, 2526; Hu et al., *J. Phys. Chem. B* 2003, 107, 13838-13842; Moon et al., *J. Phys. Chem. B* 2001, 105, 5677-5681; Niyogi et al., *J. Am. Chem. Soc.* 2001, 123, 733-734; Sen et al., *Chem. Mater.* 2003, 15, 4273-4279; Smith et al., *Carbon* 2003, 41, 1221; Thien-Nga et al., *Nano Lett.* 2002, 2, 1349-1352; Zhao et al., *J. Am. Chem. Soc.* 2001, 123, 11673-11677; Zimmerman et al., *Chem. Mater.* 2000, 12, 1361-1366. A common approach has been to use strong oxidation followed by an acid treatment. An oxidative treatment of raw SWNT material is effective in removing non-nanotube carbon and exposing the metal catalysts by removing carbon coating. However nanotubes can be lost or damaged during the oxidation process.

As a result of the foregoing, the current art of purifying single-wall carbon nanotubes has had limited success with regard to minimizing damage to the nanotube sidewall, and, concurrently, optimizing carbon yield and reaction time. Accordingly, it would be desirable to have a scalable purification method that removes only carbon impurities and metal catalysts—without damaging the nanotubes being purified, or wherein such damage is held to a minimum.

BRIEF DESCRIPTION OF THE INVENTION

The present invention relates to processes for the purification of single-wall carbon nanotubes (SWNTs). Known methods of single-wall carbon nanotube production result in a single-wall carbon nanotube product that contains single-wall carbon nanotubes in addition to impurities including residual metal catalyst particles and amounts of small amorphous carbon sheets that can surround the catalyst particles and appear on the side of the single-wall carbon nanotubes. The purification processes (methods) of the present invention remove the extraneous carbon as well as metal-containing residual catalyst particles.

In some embodiments, the present invention is directed to methods of purifying SWNTs, where such methods comprise the steps of: (a) providing a quantity of as-produced, unpurified SWNTs, said unpurified SWNTs being inherently contaminated with metal particles and other non-nanotube carbon structures; (b) oxidizing the unpurified SWNTs by exposure to oxygen at elevated temperatures, wherein said oxidizing removes the non-nanotube carbon structures, but converts the metal particles to metal oxide particles; (c) converting the metal oxide particles to metal oxide/fluoride particles by exposure to a fluorine-containing gas to yield partially-purified SWNTs; (d) annealing the partially-purified SWNTs in $H_2$ to yield reduced partially-purified SWNTs; and (e) removing metal particles in the reduced partially-purified SWNTs, using Soxhlet extraction with hydrochloric acid (or other similar extraction means), to yield purified SWNTs.

Generally, the oxidizing step serves a two-fold purpose. The first purpose is to remove amorphous carbon by oxidizing the amorphous carbon species to carbon oxides. The other purpose is to convert the metal-containing catalyst particles into metal oxides. Since the metal oxides are larger in volume than the metal catalyst particles, they cause further cracking and fracturing of the carbon encapsulation. The oxidation is generally done in an oxidizing gaseous atmosphere, typically comprising oxygen. The oxygen concentration can range generally from about 1 vol % to about 100 vol %, and is typically about 20 vol %. Nitrogen, or inert gases such as argon, can be used to dilute the oxygen concentration. The oxidation temperature can range generally from about 150° C. to about 500° C., and typically from about 150° C. to 350° C. The oxidation time can range from about 30 minutes to about 3 hours.

In some embodiments, the step of converting (inactivation) converts the metal-containing catalyst and metal oxides into metal oxide/fluoride compounds (conversion to metal fluorides is typically incomplete) with fluorine-containing gases. Since the metal oxide/fluoride compounds are very stable and do not have the catalytic effects in the oxidation of single-wall carbon nanotubes, the metal-containing catalyst particles and metal oxides are inactivated. The inactivation is generally done in a fluorine-containing gaseous atmosphere, typically comprising a fluorine-containing species such as $C_2H_2F_4$ or $SF_6$. The $C_2H_2F_4$ or $SF_6$ (or other fluorine-containing species) concentration can range generally from about 1 vol % to about 100 vol %, and is typically about 1 vol %. The inactivation reaction temperature can range from about 150° C. to 500° C. The reaction time can range from about 30 minutes to about 3 hours. To protect SWNTs and avoid local heat production during the oxidation reaction that might damage the sidewalls of the nanotubes, the inactivation process and the oxidation process can operate simultaneously. The single-wall carbon nanotubes can be subjected to more subsequent oxidation/inactivation cycles, either at the same or higher temperatures.

In some embodiments, after all oxidation/inactivation cycles, the SWNTs are annealed in hydrogen gas to reduce any oxides or hydroxides and recover the SWNTs. The temperature of annealing can range from about 500° C. to about 1000° C. The concentration of hydrogen gas can range from about 1 vol % to about 100 vol %. The total pressure during annealing is typically about 760 Torr.

In some embodiments, the metal-containing impurities, including pure metals, metal carbides, metal oxide and metal fluoride compounds, are removed by an acid extraction means such as Soxhlet extraction with hydrochloric acid. The concentration of HCl solution is about 20 wt %. The extraction time can range from about 12 hours to about 24 hours. Additionally or alternatively, the SWNTs in a refluxed HCl solution can be extracted with hexane. When the ratio of nanotubes to pure hexane is 1 g to 5 mL, the SWNTs form "pearls" with diameters of about 1 to 2 mm. When the ratio of nanotubes to pure hexane is 1 g to 2 mL, the SWNTs form powder (small pearls).

Purified SWNTs provided by the present invention can have unique purity and quality, said being suitable for electronic and magnetic devices. The above-mentioned properties are better than the wet air purified and the acid-oxidation purified SWNTs currently being used in the above-mentioned application.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention relates to processes for the purification of single-wall carbon nanotubes (SWNTs). Known methods of single-wall carbon nanotube production result in a single-wall carbon nanotube product that contains single-wall carbon nanotubes in addition to impurities including residual metal catalyst particles and amounts of small amorphous carbon sheets that surround the catalyst particles and appear on the side of the single-wall carbon nanotubes. The present purification processes remove the extraneous carbon as well as metal-containing residual catalyst particles.

In some embodiments, the present invention is directed to methods of purifying SWNTs, where such methods comprise the steps of: (a) providing a quantity of as-produced, unpurified SWNTs, said unpurified SWNTs being inherently contaminated with metal particles and other non-nanotube carbon structures; (b) oxidizing the unpurified SWNTs by exposure to oxygen at elevated temperatures, wherein said oxidizing removes the non-nanotube carbon structures, but converts the metal particles to metal oxide particles; (c) converting the metal oxide particles to metal oxide/fluoride particles by exposure to a fluorine-containing gas to yield partially-purified SWNTs; (d) annealing the partially-purified SWNTs in $H_2$ to yield reduced partially-purified SWNTs; and (e) removing metal particles in the reduced partially-purified SWNTs, using Soxhlet extraction with hydrochloric acid (or other similar extraction means), to yield purified SWNTs. In some such embodiments, the steps of oxidizing and converting are done simultaneously. In some such embodiments, the steps are repeated on the purified SWNTs to yield purified SWNTs of higher purity. Metal oxide/fluoride particles, as described herein, generally have a composition that includes a mixture of metal oxide and metal fluoride.

In some of the above-described embodiments, the oxygen used in the oxidizing step is diluted with an inert gas such as $N_2$, Ar, and the like. In some embodiments, the oxidizing is done at an oxidizing temperature between about 150° C. to about 500° C.

Generally speaking, the fluorine-containing gas used in the converting step can be any fluorine-containing species operable for converting metal oxide species to metal fluoride species, in accordance with embodiments of the present invention. In some embodiments, the fluorine-containing gas is selected from the group consisting of $C_2H_2F_4$, $SF_6$, and combinations thereof.

In some of the above-described embodiments, the annealing step is done at an annealing temperature between about 500° C. and about 1000° C. In some such embodiments, the annealing is done under an annealing atmosphere that is at a pressure of about 760 torr, and wherein $H_2$ comprises between about 1% and about 100% of the annealing atmosphere.

In some of the above-described embodiments, in the step of removing, the acid used is hydrochloric acid that is about 20% HCl. Such concentration, however, is variable, as is selection of the particular acid used. In some such embodiments, the extraction employed is Soxhlet extraction, and such extraction involves an extraction duration between about 12 hours and about 24 hours.

While the above-described embodiments have been largely directed to the purification of SWNTs, it will be appreciated by those of skill in the art that such methods can be usefully employed in the purification of any type of as-produced carbon nanotube product, wherein such product comprises metal impurities. Besides SWNTs, such as-produced carbon nanotube products include multi-wall carbon nanotubes (MWNTs) and small diameter (<3 nm) carbon nanotubes (CNTs). Generally, such metal impurities result from metal-containing species used as catalysts in the synthesis of the carbon nanotubes. During the carbon nanotube growth process, such metal is present as, or decomposes into, metal nanoparticles which ultimately become overcoated with carbon and deactivated. Such overcoated metal particles are difficult to remove using prior art purification techniques.

In summary, the present invention, which involves converting such above-described metal-containing catalyst particles and metal oxides into metal oxide/fluoride compounds with fluorine-containing gases, inactivates the metal-containing catalyst particles and metal oxides and avoids localized heating during the oxidation. Therefore, the present invention provides purification methods for the production of high purity (metal <1 wt %) and quality SWNTs with high carbon yield (about 70%) and minimal sidewall damage. These methods are rapid, effective, adaptable to continuous processing, and readily scalable for processing large quantities of single-wall carbon nanotubes.

EXAMPLES

Figure 8:
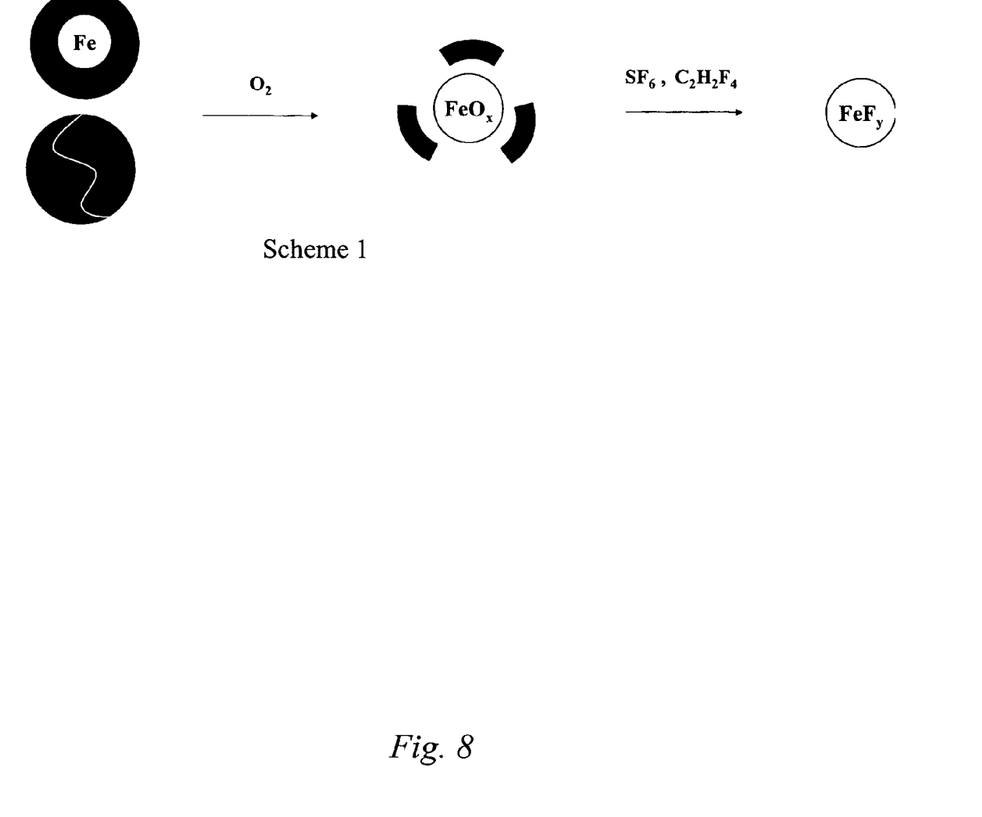
FIG. 8 (Scheme 1) schematically depicts the chemical reactions involved in the oxidation and inactivation (deactivation) processes. The solid black color represents the carbon shell. The white curve on the black cycle represents a seam on the carbon shell. The white cycle is metal particle, metal oxide or metal fluoride. During oxidation the carbon shell reacts with the oxygen and produces carbon dioxide and the metal is converted into metal oxide. During deactivation, the fluorine-containing gas converts the metal oxide into metal fluoride and deactivates the metal catalyst.

What follows is an exemplary description illustrating exemplary embodiments (i.e., examples) of the present invention. This exemplary description is more fully detailed in Xu et al., *Nano Lett.*, 2005, 5, 163-168. It should be appreciated by those of skill in the art that the methods disclosed in the exemplary description which follows merely represent exemplary embodiments of the present invention. However, those of skill in the art should, in light of the present disclosure, appreciate that many changes can be made in the specific embodiments described and still obtain a like or similar result without departing from the spirit and scope of the present invention Herein, Applicants disclose a scalable multi-step purification method to remove metal catalysts and remove non-nanotube carbon from raw (i.e., unpurified) HiPco SWNTs. This scalable multi-step purification method involves two processes: oxidation and deactivation of metal oxides. In the oxidation process, metal catalysts coated by non-nanotube carbon are oxidized by $O_2$ and exposed in multiple steps of increasing temperature (150° C. through 350° C.). In the deactivation process, exposed metal oxides are deactivated by conversion to metal fluorides through reacting with $C_2H_2F_4$, $SF_6$ or other fluorine-containing gases to avoid the catalytic effect of iron oxide on SWNT oxidation. While not intending to be bound by theory, the proposed mechanism of purification is shown in FIG. 8 (Scheme 1), wherein the solid black color represents the carbon shell; the white curve on the black cycle represents a seam on the carbon shell; the white cycle is metal particle, metal oxide or metal fluoride; wherein during oxidation the carbon shell reacts with the oxygen and produces carbon dioxide and the metal is converted into metal oxide; and wherein during deactivation, the fluorine-containing gas converts the metal oxide into metal fluoride and deactivates the metal catalyst.

Figure 1:
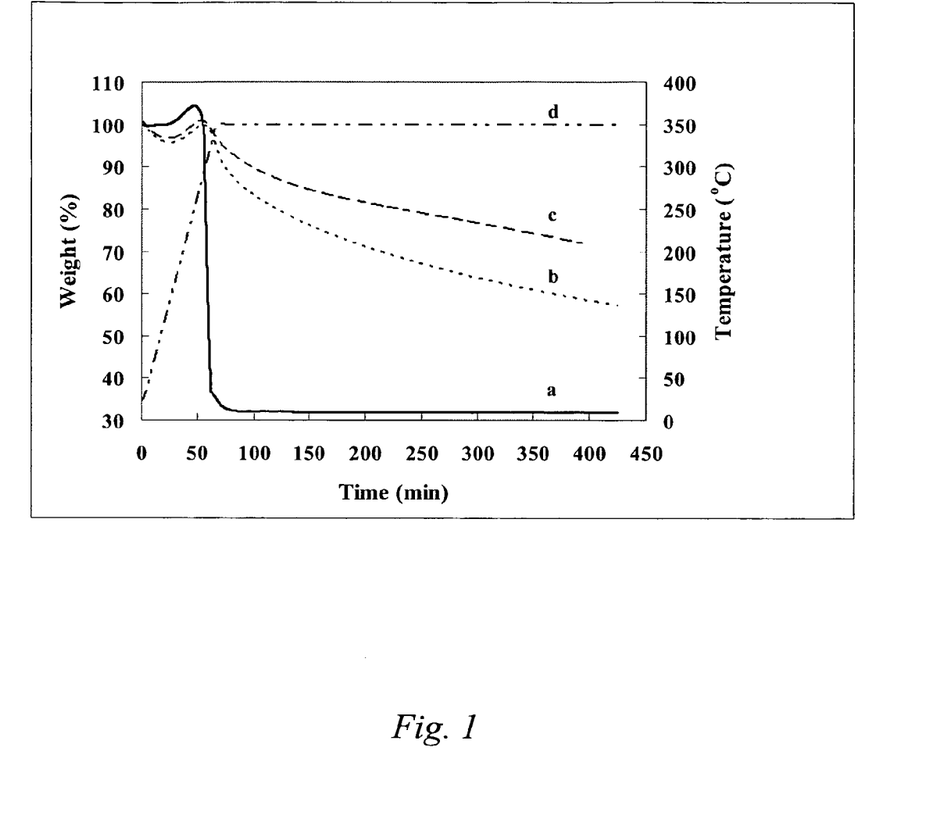
FIG. 1 depicts TGA of raw HiPco SWNTs heated in different gases: (a) 20% $O_2$, (b) 20% $O_2$ and 5% $C_2H_2F_4$, (c) 20% $O_2$ and 5% $SF_6$; and where the time-temperature profile is shown in (d).

FIG. 1 shows thermal gravimetric analyses (TGA) of raw HiPco SWNTs in $N_2/O_2$, $N_2/O_2/C_2H_2F_4$ and $N_2/O_2/SF_6$ as a function of time during heating. Weight gain during the initial heating is caused by the oxidation of iron particles. Applicants have found that all raw HiPco material is burned out at 325° C. in air within 5 minutes in the absence of fluorine-containing gases. It is well known that purified SWNTs will not oxidize at temperatures lower than ~350° C. [Chiang et al., *J. Phys. Chem. B* 2001, 105, 8297-8301], so the catalytic effect of iron oxide on nanotube oxidation is clearly apparent. However, when 5% $C_2H_2F_4$ or $SF_6$ gas was added into the $N_2/O_2$, the weight loss was less than 40% after heating at 350° C. for 6 hours. This means that $C_2H_2F_4$ and $SF_6$ can efficiently deactivate the iron oxide and suppress the oxidation rate of SWNTs.

In Applicants' purification experiments, samples (typically 10-40 grams) were placed in a 5-inch-diameter quartz reactor which was centered in a 6-inch-diameter horizontal quartz tube in a furnace. 1 L/min $N_2$ was flowed both inside and outside of the reactor and maintained at atmospheric pressure. After purging the sample with 1 L/min $N_2$ at 150° C., 200 mL/min $O_2$ and 50 mL/min $SF_6$ were both turned on and allowed to contact (i.e., flowed over) the sample for 1 hour. After this oxidation step, $O_2$ was turned off and the temperature was then ramped to 175° C. within half an hour while 50 mL/min $SF_6$ was maintained to deactivate the exposed metal catalysts. After this deactivation step, $O_2$ was turned on again for 1 hour while the temperature was maintained at 175° C. The oxidation/deactivation processes were repeated with a 25° C. increase up to 350° C. The temperature and gas flow rate changes were controlled by a LABVIEW program. The finished sample was then cooled down in $N_2$. Finally, the exposed metal was removed by 6M HCl Soxhlet extraction for 12 hours. The purified SWNT was extracted with hexane and dried in vacuum at 50° C. for 24 hours.

Figure 2:
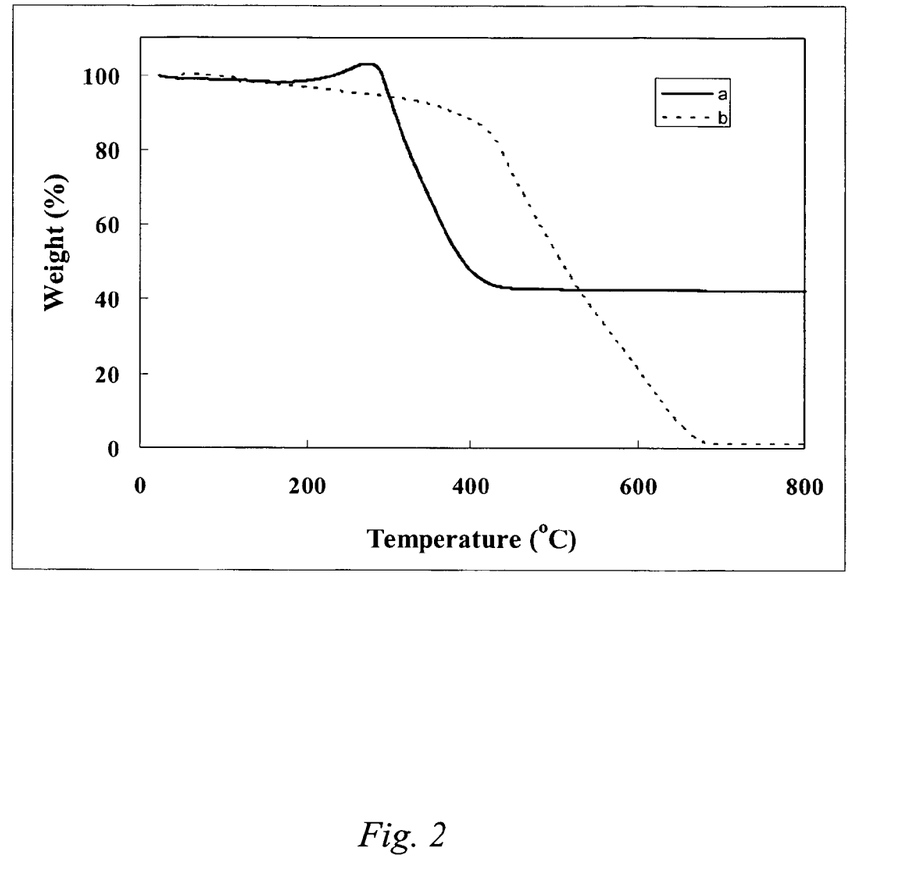
FIG. 2 depicts TGA of raw and purified SWNTs heated in dry air, where (a) depicts raw (unpurified) material, and (b) depicts samples purified with 20% $O_2$ and 1% $SF_6$.
Figure 3:
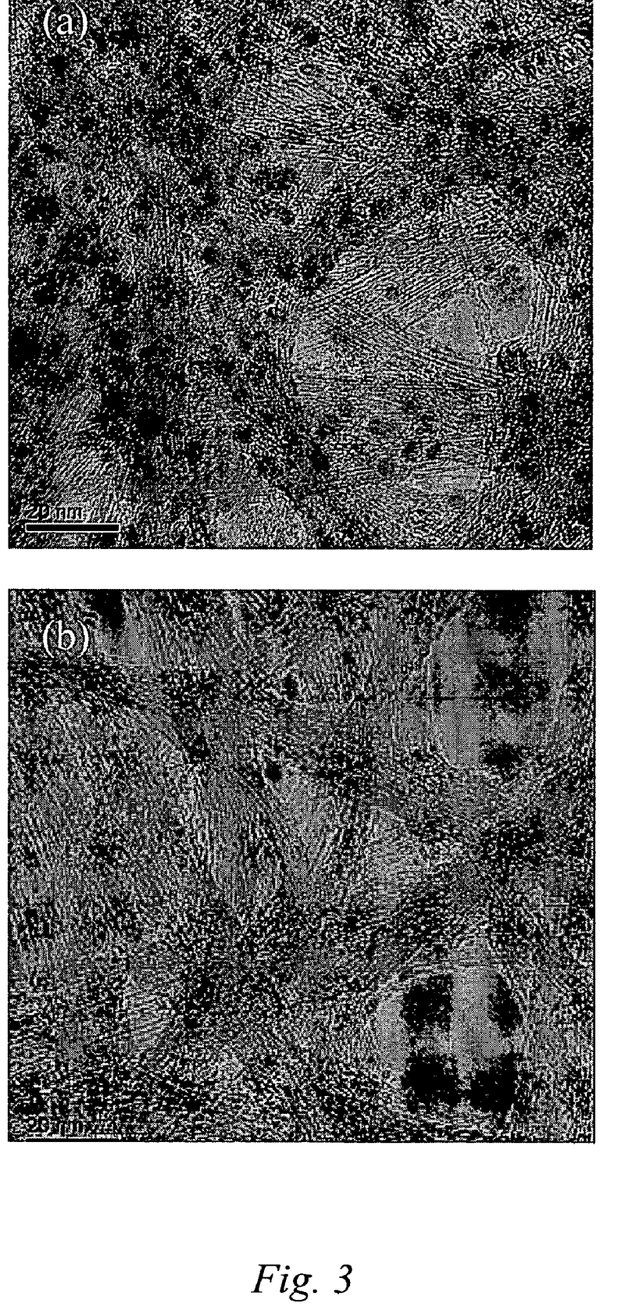
FIG. 3 depicts TEM images of (a) raw material and (b) a purified sample treated with 20% $O_2$ and 5% $SF_6$; and where (c) depicts the diameter distribution of metal particles in the raw material.
Figure 3C:
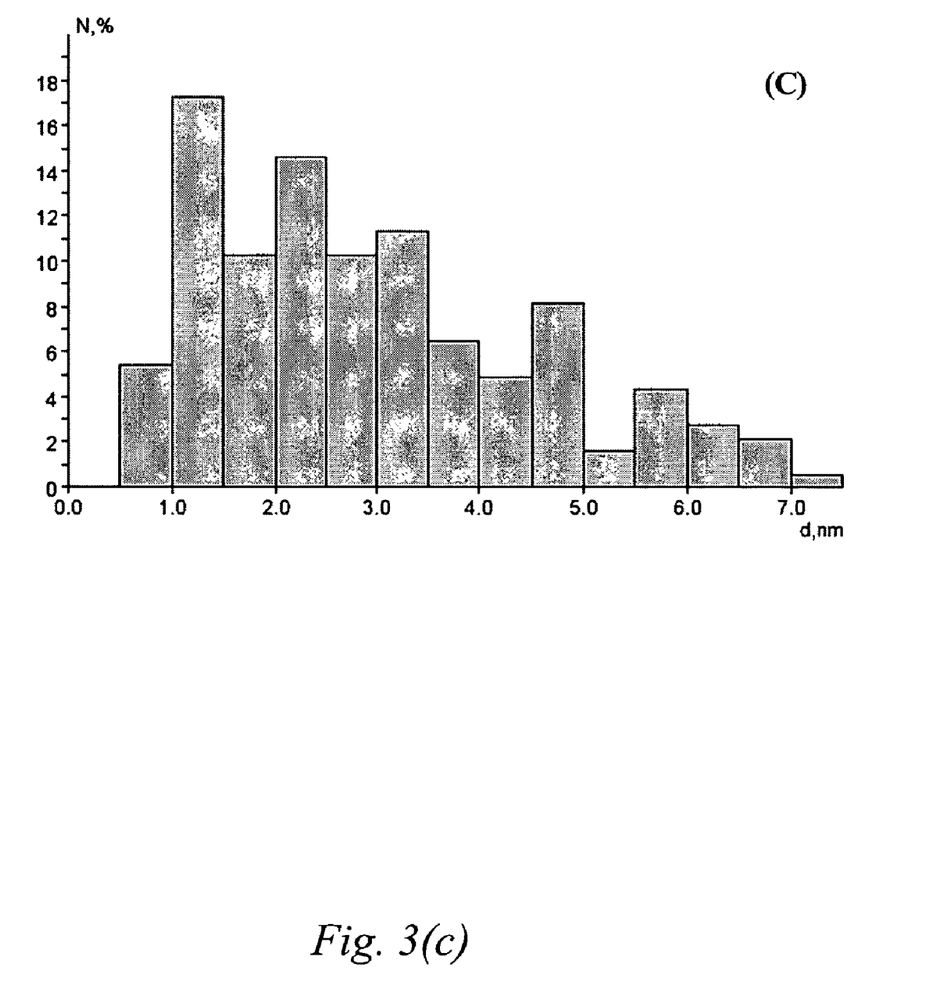

The purity and quality of each sample were documented by TGA; Raman, fluorescence, and UV-vis-near-IR spectroscopies; and transmission electron microscopy (TEM). The purity of the purified sample is typically higher than 98 wt % with a carbon yield near 70%. TGA data was recorded with a TA Instruments Q500-TGA analyzer. In all experiments, samples (typically ~10 mg) in an alumina pan were heated in dry air (100 mL/min) to 800° C. at a rate of 5° C./min. FIG. 2 shows the weight loss behavior of raw and purified SWNTs in dry air. This set of data demonstrates that the purified samples are stable in air at temperatures as high as ~450° C. and their Fe contents are reduced from 30 wt % to approximately 1 wt %. TEM images were also obtained with a JEOL 2010 TEM at 100 kV. The samples were prepared by sonicating SWNTs in acetone and dropping the suspension onto lacey carbon grids. As shown in FIG. 3(a), metal particles are identified as the dark particles. The metal particles are aggregated and associated with large fullerenes in the raw materials. In the purified sample shown in FIG. 3(b), metal particles and fullerenes are absent. Rough edges on the nanotubes are likely due to a small amount of remaining non-nanotube carbon and large fullerenes. In addition, software from Smart Imaging Technologies was used to measure the size of metal particles in raw materials. The diameter distribution of such metal particles in a raw sample is shown in FIG. 3(c). The average diameter was found to be ~3 nm.

Figure 4:
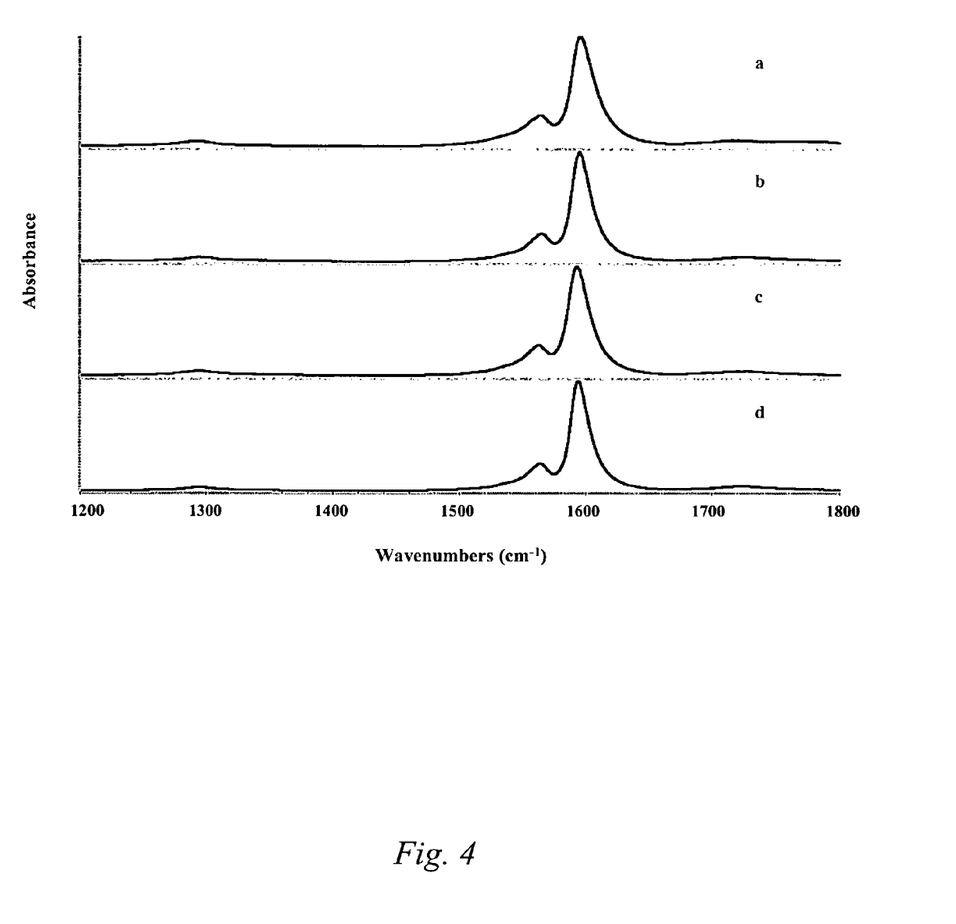
FIG. 4 depicts Raman spectra of raw and purified SWNTs: raw material (a); and SWNTs purified with 20% $O_2$ and 5% $C_2H_2F_4$ (b), with 20% $O_2$ and 5% $SF_6$ (c), and with 20% $O_2$ and 1% $SF_6$ (d).
Figure 5:
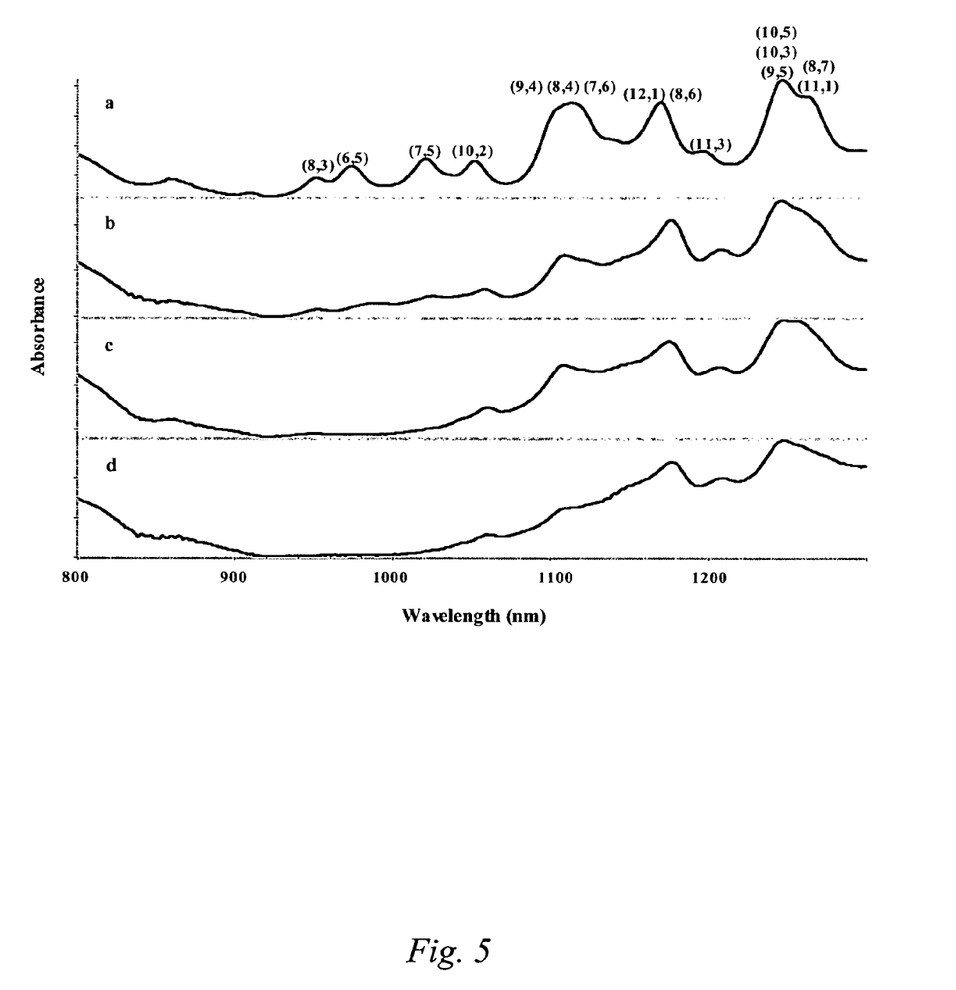
FIG. 5 depicts UV spectra of raw and purified SWNTs in 1% SDS at pH 10: raw material (a); and SWNTs purified with 20% $O_2$ and 5% $C_2H_2F_4$ (b), with 20% $O_2$ and 5% $SF_6$ (c), and with 20% $O_2$ and 1% $SF_6$ (d).

Raman, UV-vis-near-IR and fluorescence spectra show that there is little damage to nanotube during the purification process. Raman spectra were collected with a Renishaw micro-Raman Spectrometer equipped with a 780 nm laser and are shown in FIG. 4. Typical SWNT Raman features are observed for the tangential modes and radial modes near 1591 and 200 cm$^{-1}$, respectively. The D-peak (1291 cm$^{-1}$) can be activated by inducing disorder in the sidewalls of SWNTs and is associated with sidewall defects. Applicants have found that the ratio of the D-peak (1291 cm$^{-1}$) to G-peak (1591 cm$^{-1}$) decreases after purification. Applicants have also observed a change in relative intensity for various peaks of the breathing mode on going from raw material to purified samples, which suggests that the content of smaller diameter SWNTs has increased relative to the larger diameter ones. While not intending to be bound by theory, it is likely that this relative intensity change is due to a different coupling of the electronic resonance enhanced spectra to the Raman laser (782 nm) rather than to a relative change in tube diameter populations in the purified sample. In fact, electronic spectra such as UV-vis-near-IR spectra and fluorescence spectra, which Applicants believe to be more reliable measures of tube diameter distribution, shown in FIG. 5 and FIG. 6 respectively, indicate that small diameter tubes are preferentially lost or functionalized in the purification process. UV-vis-near-IR spectra were obtained with a Shimadzu UV-3101 PC spectrometer. SWNT samples were dispersed in 1 wt % sodium dodecylsulfate (SDS) surfactant, homogenized for 1 hour, sonicated for 10 minutes in a cup-horn sonicator (Cole-Parmer CPX-600), and centrifuged for 4 hours at 29000 rpm. The decant (the upper 75% to 80% of supernatant) was adjusted to pH=10 for UV-vis-near-IR experiments [O'Connell et al., Science 2002, 297, 593-596]. FIG. 5 shows the UV-vis-near-IR spectra of SWNTs as raw material, and as purified with 20% $O_2$ and 5% $C_2H_2F_4$, 20% $O_2$ and 5% $SF_6$, and 20% $O_2$ and 1% $SF_6$. The spectra between 800 nm and 1300 nm wavelengths shows the first van Hove transition, $E_{11}$. From (b) to (d), the carbon yields decrease from 68% to 36%, as shown in Table 1, while the peaks corresponding to the smaller diameter tubes decrease as well, especially the peak near 1100 nm. These UV-vis-near-IR spectra indicate a preferential loss of smaller diameter tubes during the purification process. This indicates that the reactivity of a particular single-walled carbon nanotube is directly related to the pi-orbital mismatch associated with increased curvature, which causes smaller diameter nanotubes to be more reactive.

Figure 6:
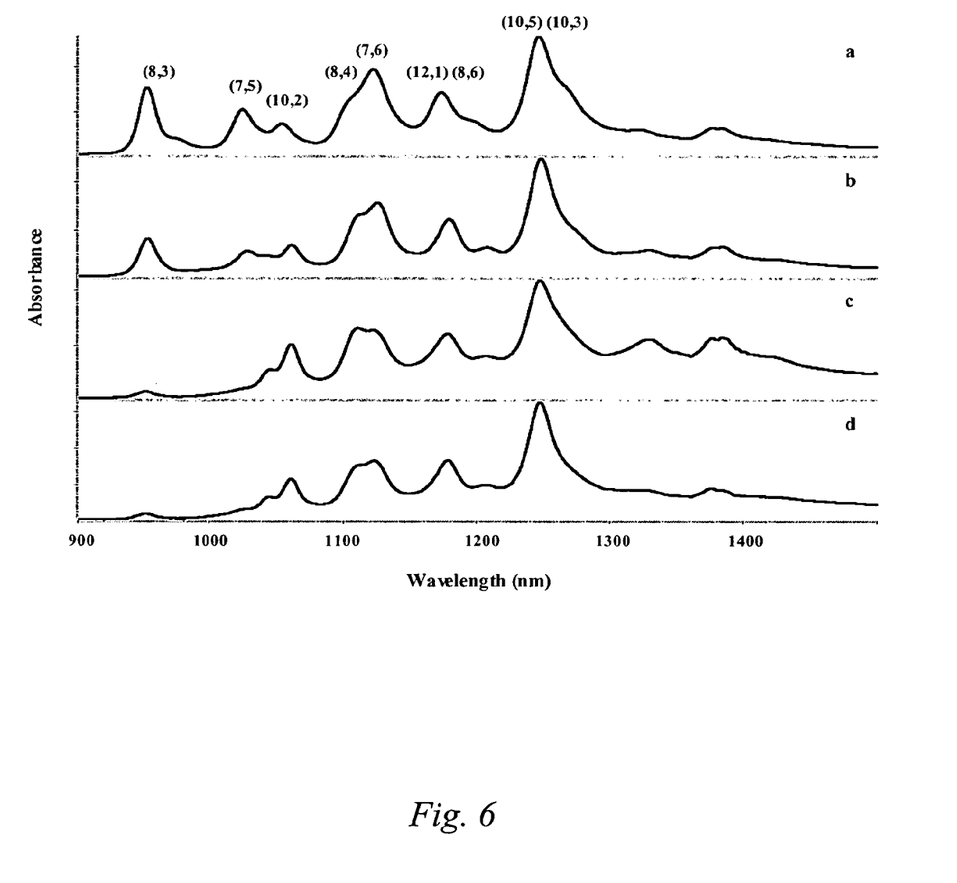
FIG. 6 depicts fluorescence spectra of raw and purified SWNTs in 1% SDS at pH 10: raw material (a); and SWNTs purified with 20% $O_2$ and 5% $C_2H_2F_4$ (b), with 20% $O_2$ and 5% $SF_6$ (c), and with 20% $O_2$ and 1% $SF_6$ (d).

Applicants performed fluorescence spectroscopic measurements with a J-Y Spex Fluorolog 3-211 equipped with an indium-gallium-arsenide near-infrared detector cooled by liquid nitrogen [Bachilo et al., Science 2002, 298, 2361-2366]. Emission intensity was measured as a function of emission wavelength (from 800 to 1570 nm), with excitation wavelength 669 nm, 1-nm steps, and 3-nm spectral slit widths. Samples were prepared by the same method as those for UV spectra. FIG. 6 shows the Fluorescence spectra of SWNTs as raw material; and samples purified with 20% $O_2$ and 5% $C_2H_2F_4$, 20% $O_2$ and 5% $SF_6$, and 20% $O_2$ and 1% $SF_6$. There were no shifts in frequency between the purified sample and the raw material, which indicates that little sidewall damage and defects were produced by the purification process. In addition, Applicants noted that peaks near 952 nm decreased as the carbon yield decreased from 68% to 36%, as shown in Table 1. This indicates that (8, 3) nanotubes, which correspond to 952 nm, are more easily oxidized. Both FIG. 5 and FIG. 6 show that, during oxidation, smaller diameter nanotubes are more readily oxidized than larger diameter nanotubes.

TABLE 1

Carbon yields obtained from purification methods of the present invention, but employing different parameters. The SWNT yield is defined as the percentage of purified SWNTs to the raw SWNTs (excluding metal).

| Procedure | Raw Fe wt % | Purified Fe wt % | SWNT Yield |
|---|---|---|---|
| Multi-step with 20% $O_2$ and 5% $C_2H_2F_4$ | 30% | 1.5% | 68% |
| Multi-step with 20% $O_2$ and 5% $SF_6$ | 30% | 0.3~4.3% | 62% |
| Multi-step with 20% $O_2$ and 1% $SF_6$ | 30% | 0.2~0.5% | 36% |

In general, all purification methods of raw SWNT product expose the metal catalyst by oxidation. However, since metal oxides can also act as oxidizing catalysts, it is inevitable that some SWNTs will be lost. The yield of the purification procedure is highly dependent on controlling the oxidation process to prevent hot spot development (i.e., localized heating) and accelerated oxidation. In the purification processes of the present invention, control of catalytic oxidation is achieved by using a fluorine-containing gas to convert iron oxide into iron fluoride. In addition, during the oxidation and catalyst deactivation processes, Applicants have found that the progress of the reaction could be monitored by Fourier transform-infrared (FT-IR) spectroscopic analysis of the effluent gases. This allows an in situ investigation of gas-phase chemistry and enables the following of (in terms of reaction progress) the carbon etching—without exposing the sample to air. Because non-nanotube carbon is mostly large fullerenes in the HiPco material, these impurities are more easily oxidized than SWNT. Therefore, at the beginning of the oxidation process, most of the $CO_2$ and CO gas result from the oxidation of large fullerenes.

Figure 7:
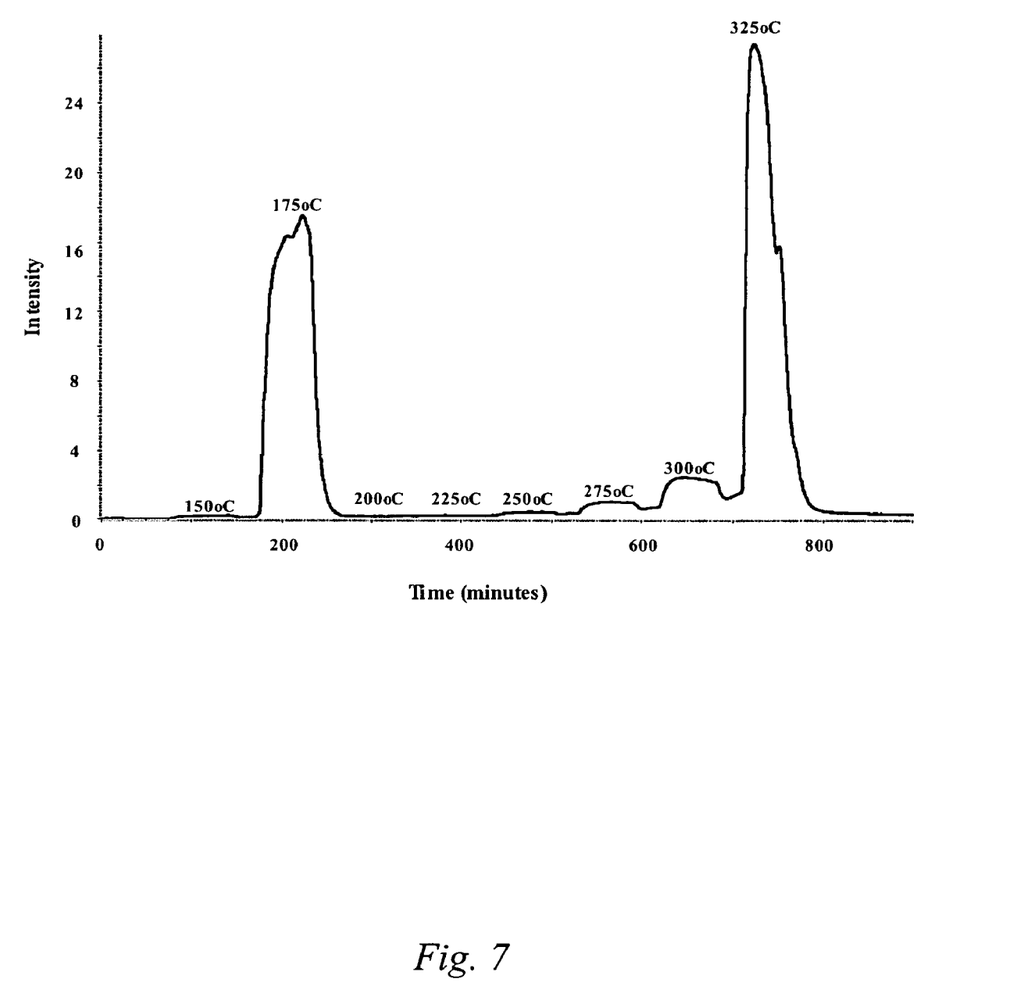
FIG. 7 depicts FT-IR spectra of the $CO_2$ peak area between 3800 and 3500 $cm^{-1}$, wherein the raw material was purified with 20% $O_2$ and 5% $SF_6$, and the temperature was successively increased to 325° C.

FIG. 7 shows a series of FT-IR spectra of gas purification products ($CO_2$ and CO) as a function of time. From these spectra, Applicants were able to follow carbon etching and monitor the oxidation reaction. This has allowed an optimization of the purification gas ratio and oxidation temperature. Table 1 shows carbon yields for different conditions. It is clear from this data that achieving the lowest iron contents results in the loss of small diameter nanotubes.

Accordingly, as demonstrated in the exemplary description above, the present invention provides a scalable multi-step method for purifying raw SWNT samples. Characterization of purified material by using TEM, TGA, UV-vis-near-IR, fluorescence and Raman clearly shows that the cleaned SWNTs have little sidewall damage. Iron contents of approximately 1 wt % with approximately 70% SWNT yield can be achieved with in situ fluoride deactivation of iron oxide catalyst particles.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method for purifying SWNTs, said method comprising the steps of:
   a) providing a quantity of unpurified SWNTs,
      wherein the unpurified SWNTs further comprise metal particles and non-nanotube carbon structures;
   b) simultaneously exposing the unpurified SWNTs to oxygen and a fluorine-containing gas at elevated temperatures to form metal oxide/fluoride particles and partially-purified SWNTs,
      wherein the exposing step oxidizes and removes at least a majority of the non-nanotube carbon structures; and
      wherein the exposing step oxidizes the metal particles to metal oxide particles and inactivates the metal oxide particles by at least partially converting the metal oxide particles into metal fluoride particles to form the metal oxide/fluoride particles;
         wherein the metal oxide/fluoride particles are non-catalytic toward SWNT oxidation;
   c) annealing the partially-purified SWNTs in an atmosphere comprising $H_2$ to yield reduced partially-purified SWNTs; and
   d) extracting the reduced partially-purified SWNTs with an acid to yield purified SWNTs,
      wherein the extracting step comprises removing the metal oxide/fluoride particles.

2. The method of claim 1, further comprising exposing the partially-purified SWNTs and metal oxide/fluoride particles to a fluorine-containing gas after step b) is completed.

3. The method of claim 1, wherein the steps of exposing, annealing and extracting are repeated on the purified SWNTs to yield purified SWNTs of higher purity.

4. The method of claim 1, wherein the oxygen is diluted with an inert gas.

5. The method of claim 1, wherein the exposing step is performed at a temperature between about 150° C. to about 500° C.

6. The method of claim 1, wherein the fluorine-containing gas is selected from the group consisting of $C_2H_2F_4$, $SF_6$ and combinations thereof.

7. The method of claim 1, wherein the annealing step is performed at a temperature between about 500° C. and about 1000° C.

8. The method of claim 1, wherein the annealing step is performed at atmospheric pressure.

9. The method of claim 1, wherein the extracting step comprises a Soxhlet extraction.

10. The method of claim 1, wherein the acid comprises hydrochloric acid.

11. The method of claim 1, wherein the extracting step is performed for between about 12 hours and about 24 hours.

12. A method for purifying small-diameter CNTs, said method comprising the steps of:
   a) providing a quantity of unpurified small-diameter CNTs,
      wherein the unpurified small-diameter CNTs further comprise metal particles and non-nanotube carbon structures;
   b) simultaneously exposing the unpurified small-diameter CNTs to oxygen and a fluorine-containing gas at elevated temperatures to form metal oxide/fluoride particles and partially-purified small-diameter CNTs,
      wherein the exposing step oxidizes and removes at least a majority of the non-nanotube carbon structures; and
      wherein the exposing step oxidizes the metal particles to metal oxide particles and inactivates the metal oxide particles by at least partially converting the metal oxide particles into metal fluoride particles to form the metal oxide/fluoride particles;
         wherein the metal oxide/fluoride particles are non-catalytic toward small-diameter CNT oxidation;
   c) annealing the partially-purified small-diameter CNTs in an atmosphere comprising $H_2$ to yield reduced partially-purified small-diameter CNTs; and
   d) extracting the reduced partially-purified small-diameter CNTs with an acid to yield purified small-diameter CNTs,
      wherein the extracting step comprises removing the metal oxide/fluoride particles.

13. The method of claim 12, further comprising exposing the partially-purified small-diameter carbon nanotubes and metal oxide/fluoride particles to a fluorine-containing gas after step b) is completed.

14. The method of claim 12, wherein the steps of exposing, annealing and extracting are repeated on the purified small-diameter CNTs to yield purified small-diameter CNTs of higher purity.

15. The method of claim 12, wherein the oxygen is diluted with an inert gas.

16. The method of claim 12, wherein the exposing step is performed at a temperature between about 150° C. to about 500° C.

17. The method of claim 12, wherein the fluorine-containing gas is selected from the group consisting of $C_2H_2F_4$, $SF_6$ and combinations thereof.

18. The method of claim 12, wherein the annealing step is performed at an annealing temperature between about 500° C. and about 1000° C.

19. The method of claim 12, wherein the annealing step is performed at atmospheric pressure.

20. The method of claim 12, wherein the extracting step comprises a Soxhlet extraction.

21. The method of claim 12, wherein the acid comprises hydrochloric acid.

22. The method of claim 12, wherein the extracting step is performed for between about 12 hours and about 24 hours.

23. A method for purifying SWNTs, said method comprising the steps of:
   a) providing a quantity of unpurified SWNTs,
      wherein the unpurified SWNTs further comprise metal particles and non-nanotube carbon structures;
   b) simultaneously exposing the unpurified SWNTs to oxygen and a fluorine-containing gas at elevated temperatures to form metal oxide/fluoride particles and partially-purified SWNTs,
      wherein the exposing step oxidizes and removes at least a majority of the non-nanotube carbon structures; and
      wherein the exposing step oxidizes the metal particles to metal oxide particles and inactivates the metal oxide particles by at least partially converting the metal oxide particles into metal fluoride particles to form the metal oxide/fluoride particles;

wherein the metal oxide/fluoride particles are non-catalytic toward SWNT oxidation; and c) extracting the partially-purified SWNTs with an acid to yield purified SWNTs, wherein the extracting step comprises removing the metal oxide/fluoride particles.

24. The method of claim 23, further comprising:
repeating the exposing step.

25. The method of claim 24, further comprising a step of annealing the partially-purified SWNTs in an atmosphere comprising $H_2$.

26. The method of claim 23, wherein the fluorine-containing gas is selected from the group consisting of $C_2H_2F_4$, $SF_6$ and combinations thereof.

* * * * *